Feb. 19, 1946.　　M. SCHWARTZ ET AL　　2,395,074
PHOTOGRAPHIC APPARATUS
Filed May 1, 1944
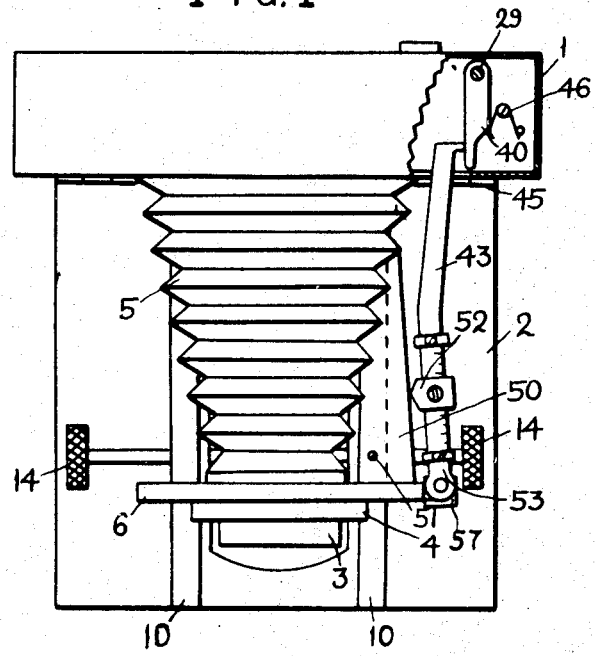
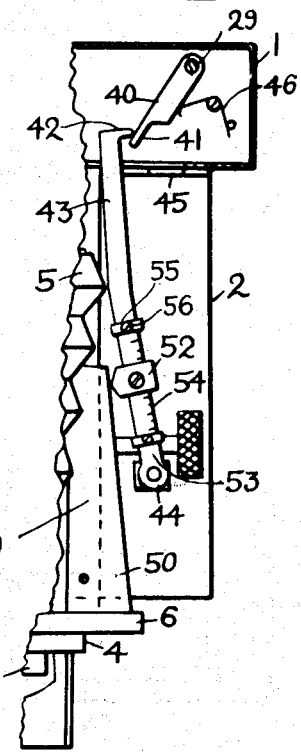
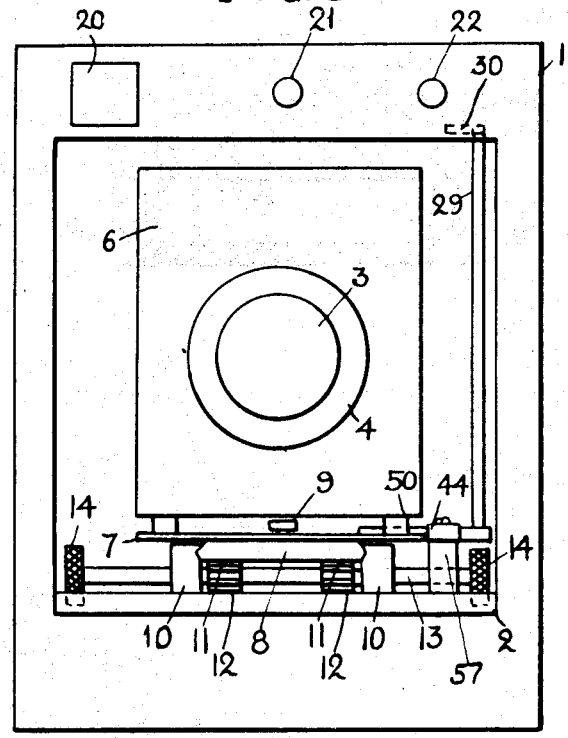
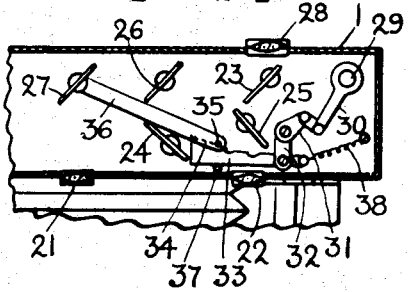
MORRIS SCHWARTZ
WILLIAM CASTEDELLO
INVENTORS Patented Feb. 19, 1946

2,395,074

UNITED STATES PATENT OFFICE 2,395,074

PHOTOGRAPHIC APPARATUS

Morris Schwartz and William Castedello, Stamford, Conn., assignors to The Kalart Company, Inc., Stamford, Conn.

Application May 1, 1944, Serial No. 533,451

5 Claims. (Cl. 95—44)

Our invention relates to improvements in photographic apparatus such as photographic cameras, television cameras, movie cameras, etc., particularly to improvements in cameras equipped or associated with a range finder controlled by movements of the camera lens.

Our invention is applicable to and useful for all types of range finders which are adjusted by changing the angular position of a reflector such as a mirror.

One object of our invention is to provide novel and improved means to adjust the angular positoin of the reflector of the range finder corresponding to the lens movements for the purpose of focusing the lens by means of the range finder.

Another object of our invention is to adjust the angular position of the reflector by adjustment means placed in the casing of the camera.

Another object of our invention is to provide novel and improved means for conveniently adjusting the changes of the angular position of the reflector caused by a given movement of the camera lens according to the focus of the lens inserted in the camera. We hereby accomplish that the lens can be correctly focused irrespective of the optical properties of the lens inserted in the camera.

Other and further objects and advantages of our invention will be hereinafter set forth and other features thereof by the appended claims.

Referring to the drawing which illustrates a possible and preferred embodiment of our invention, but to which our invention is by no means restricted since the drawing is merely shown by way of illustration and not by way of limitation.

Figure 1 is a partial sectional plan view of a conventional camera equipped with a range finder and adjustment means for the range finder according to our invention.

Figure 2 shows a sectional plan view of the adjustment means in a different position.

Figure 3 is a front view of Figure 1, and

Figure 4 shows a diagrammatic view of a type of a range finder which can be used in conjunction with adjustment means according to our invention.

The camera shown on the drawing comprises a casing 1, a camera bed 2, a lens 3, shutter means 4, and a bellows 5. The lens and the shutter are supported on a lens support 6, which is mounted on a base plate 7. The lens support 6 with the base plate 7, and the bellows are fitted in casing 1 when the camera is closed and can be rigidly attached to a carriage 8 by any suitable means such as a thumb screw 9. Carriage 8 is connected to and guided by two rails 10 fastened to camera bed 2 by any suitable means when the camera is readied for use. Carriage 8 and rails 10 are preferably dovetailed to secure an accurate guidance. The carriage is moved on the camera bed by drive means which may comprise toothings or racks 11 provided at the lower side or at the rim of carriage 8 and engaged by respective pinions 12 mounted on an axle 13 manually operable by one or more knurled wheels 14. By operating the carriage and with it the lens support 6, the lens can be placed in any position on the camera bed as required for a proper focusing of the lens. The camera shown on the drawing further includes a range finder indicated by the two observation windows 21 and 22. Figure 1 shows the range finder placed in a compartment provided in the upper part of the casing, however, it is of course also possible to arrange the range finder in any other convenient manner.

The camera as previously described and illustrated in the drawing is conventionally constructed and operated. Therefore, only the most essential parts of the camera are described and illustrated, particularly those parts that are essential for the understanding of our invention.

Figure 4 shows the essential parts of the range finder more in detail. The range finder comprises stationary reflectors 23, 24, 25 such as mirrors having a solidly silvered surface or prisms, a semi-transparent stationary reflector 26 such as a mirror having a partly or thinly silvered surface or a double prisms and an adjustable or pivotal reflector 27, such as a mirror having a solidly silvered surface or a prism. A beam of light coming from an object exterior to the range finder will enter through window 22 and an image of the object is projected by mirror 25 upon mirror 24 which will project it upon mirror 26. This mirror will project the image upon mirror 23 which can be observed through an observation window 28 provided in the back of casing 1. A second beam of light enters through window 21 and a second image of the object is projected through semi-transparent mirror 26 upon mirror 23. By adjusting the angular position of mirror 27 the two images can be brought in register.

Mirrors 25, 24, and 26 form an "optical detour" included in the optical path between the object and mirror 23 for the purpose of equalizing the sizes of the two images to be observed on mirror 23 thereby greatly facilitating an accurate adjustment of the range finder.

The angular position of pivotal mirror 27 is adjusted by a rotation of a shaft 29. The rotation of this shaft is transmitted to the pivotal mirror by means of an arm or lever 30 keyed to shaft 29 by any suitable means. A second lever 31 is pivoted to the free end of lever 30 at one end, the other end of lever 31 being pivotally connected to a pivotal lever 32 which in turn pivotally engages a guiding bar or compensator 33. Compensator 33 is provided with a wedged or slanted surface 34 which engages a pin or projection 35 of a lever or bar 36 fastened to pivotal mirror 27. The upper edge of compensator 33 is guided by a projection or lug 37 fastened to casing 1 of the camera. A spring 38 fastened at one end to compensator 33 and at the other end to casing 1 urges compensator 33 in engagement with lug 37. A second spring (not shown) may be provided to urge pin 35 of bar 36 into engagement with the slanted surface of compensator 33. When shaft 29 is rotated lever 30 keyed to the shaft will force the slanted surface of compensator 33 against pin 35 thus swinging bar 36 and with it adjustable mirror 27 about its pivot point (in Figure 4 bar 36 will move upward), hence any angular movement of shaft 29 will result in a corresponding angular movement of mirror 27.

Range finders of the type shown in Figure 4 are more fully described and illustrated in our co-pending patent application Ser. No. 515,882, filed December 28, 1943.

While the above described type of range finders can be advantageously used in conjunction with adjustment means according to our invention it should be understood that our invention is not limited to the described type or any similar type. The invention is applicable to and useful for all types of range finders that include a stationary mirror and a pivotal mirror, irrespective of whether a "super-imposing image" of a "split image" system or any other separating image system are employed.

The adjustment means according to our invention comprise the previously mentioned shaft 29 extending from the compartment in the upper part of the casing in which the range finder is located and preferably placed in the space between a side wall of the casing and the bellows. The lower end of shaft 29 extends substantially to the level of base plate 7 or carriage 8 and carries a lever 40 keyed to shaft 29 by any suitable means and preferably ending in a nose 41. Nose 41 is arranged to be engaged by a nose 42 of a lever 43 pivotal about a pivot point 44 preferably fastened to camera bed 2 directly or by means of a support 57. Levers 40 and 43 are arranged in such a manner that nose 42 will engage nose 41 as shown in Figures 1 and 2 when the camera bed is opened by swinging it about its hinges 45. Lever 43 is pivoted by a sliding movement of the lens support 6 relative to camera bed 2. A spring 46 or similar resilient means may be provided to urge lever 40 into engagement with lever 43 and to turn lever 40 for example in a counterclockwise direction spring 38 may also be used for this purpose. As it is apparent from the drawing a pivotal movement of lever 43 will cause a swinging movement of lever 40 either by yielding to the action of spring 46 or by the pressure of lever 43 against the action of spring 46. It should be noted that the operative coupling of the two levers 40 and 43 can be accomplished by various means. It is only essential that a pivotal movement of lever 43 corresponds to a pivotal movement of lever 40 which is transmitted to adjustable mirror 27. For the purpose of obtaining a pivotal movement of lever 43 in response to a sliding movement of lens support 6 relative to camera bed 2 a wedge or slanted member 50 is fastened to any suitable part moving together with lens support 6. The slanted member 50 may be fastened for example to base plate 7 or carriage 8 by any suitable means such as screws 51 or the slanted member may be integral with base plate 7 or carriage 8. In order to improve the accuracy of the pivotal movements of lever 43 caused by the sliding movements of slanted member 50 a pointed member 52 is mounted on lever 43. It is of course also possible to mount member 52 on slanted member 50.

Figures 1 and 2 show the various movable parts in different positions. Figure 1 shows a position in which base plate 7 and camera bed 2 are in register, which is usually the position in which the camera lens 3 is adjusted for infinity. Figure 2 shows a position in which the lens support 6 is moved further outward. In this position of the lens support the slanted member 50 has allowed a swinging movement of lever 43 toward the left and lever 40 keyed to shaft 29 has been rotated correspondingly by the action of spring 46 or spring 38. By proper adjustment of the length of the various levers and the angle of wedge or slanted member 50 a person skilled in the art can easily adjust the movements of the pivotal mirror 27 so that the lens is focused correctly corresponding to the distance of the object observed through the range finder when the two images viewed through observation window 28 are in register.

According to a further and important object of our invention pointed member 52 is slidably mounted on lever 43. By such slidable arrangement we accomplish that the angular movements of mirror 27 caused by the pivotal movements of lever 43 can be adjusted in accordance with the type and the optical properties of the lens used in the camera. It will be understood from an examination of Figures 1 and 2 that the pivotal movements of lever 43 caused by the movements of slanted member 50 will be controlled by the position of slide 52 relative to pivot point 44. The closer to pivot point 44 the slide is placed the greater will be the pivotal movement of lever 43 for a given movement of slanted member 50. Instead of using a slidable member to adjust the pivotal movement of lever 43 it is also possible to make the angle of wedge-shaped member 50 adjustable.

In order to facilitate the adjustment of the relative position of slide 52 in accordance with the optical properties of the lens used the lever 43 is bent so that it has section 53 parallel to the slanted edge of member 50 when lens support 6 is placed in the infinity position, (see Figure 1). Due to the parallelism of parts 50 and 53 in the infinity position slide 52 can be moved and adjusted without changing the angular position of pivotal mirror 27. A calibration 54 may be provided on lever section 53 to indicate the proper position of slide 52 for each type of lens. Collars 55 may be slidably mounted on lever 43. These collars can be fixed in any desired position by means of set screws 56 and serve to facilitate the adjustment of member 52 for certain types of lenses used on the camera.

While the invention has been described in detail with respect to a certain preferred example and embodiment it will be understood by those skilled in the art after understanding our invention that various changes and modifications may be made without departing from the spirit and scope of our invention, and it is intended therefore, in the appended claims to cover all such changes and modifications.

What is claimed as new and desired to be secured by Letters Patent is:

1. A photographic camera comprising a casing including a camera bed; an objective carrier including a lens and shutter means operating in conjunction with said lens; said carrier being supported on a carriage slidably mounted on the camera bed; a drive means for moving said carriage relative to the camera bed; a range finder mounted in the upper part of the casing, said range finder including a stationary reflector and a pivotal reflector; and means for adjusting said pivotal reflector, said adjusting means comprising a rotatable shaft arranged within the casing and operatively coupled at one end with the pivotal reflector for changing the angular position of the pivotal reflector by a rotation of the shaft, an arm fastened to the other end of the shaft, a lever pivotally mounted on the camera bed, one end of said lever being arranged to be in loose engagement with the arm when the camera bed is opened for converting a pivotal movement of the lever to a rotary movement of the shaft and a wedge-shaped member operatively connected with the carriage, a member supported by said lever and in engagement with said wedge-shaped member for changing the position of the pivotal lever in response to and corresponding with a change of the position of the carriage thereby controlling the angular position of the pivotal reflector.

2. A photographic camera comprising a casing, including a camera bed; an objective carrier including a lens and shutter means operating in conjunction with said lens; said carrier being supported on a carriage slidably mounted on the camera bed; a drive means for moving said carriage relative to the camera bed; a range finder associated with the casing, said range finder including a stationary reflector and a pivotal reflector; and means for adjusting said pivotal reflector, said adjusting means comprising a lever pivotally mounted on the camera bed, means for operatively coupling the lever with the pivotal reflector, a wedge-shaped member connected with the carriage, and a member adjustably mounted on the pivotal lever and engaging the wedge of the wedge-shaped member for changing the position of the pivotal lever in response to and corresponding with a change of the position of the carriage, said adjustable member being arranged to control by its position relative to the pivot point of the pivotal lever the movement of the pivotal lever in response to a given movement of the carriage, a section of said lever being arranged and shaped to be in a position parallel to the wedge of the wedge-shaped member in the infinity position of the lens for adjusting the relative position of the adjustable member without changing the angular position of the pivotal reflector.

3. A photographic camera as described in claim 2 in which the member mounted on the pivotal lever is slidably arranged on said lever.

4. A photographic camera as described in claim 2 in which the member mounted on the pivotal lever is slidably arranged on the lever and in which adjustable stopping means are provided on the lever for limiting the sliding movements of the slidably mounted member.

5. A photographic camera comprising a casing including a camera bed; a lens; a lens board mounted for movement relative to the camera bed; a range finder mounted in the upper part of the casing, said range finder including a stationary reflector and a pivotal reflector; and means for adjusting said pivotal reflector, said adjusting means comprising a rotatable shaft arranged within the casing and operatively coupled at one end with the pivotal reflector for changing the angular position of the pivotal reflector by a rotation of the shaft, an arm fastened to the other end of the shaft, a lever pivotally mounted on the camera bed, one end of said lever being arranged to engage the arm when the camera bed is opened for converting a pivotal movement of the lever into a rotatable movement of the shaft, a wedge-shaped member operatively connected with the lens board, a member slidably mounted on the pivotal lever and engaging the wedge of the wedge-shaped member for changing the position of the pivotal lever in response to and corresponding with a change of the position of the lens board relative to the camera bed, said slidable member being arranged to control by its position relative to the pivot point of the pivotal lever the movement of the pivotal lever in response to a given movement of the lens board, a section of the pivotal lever being arranged and shaped to be in a position permitting a movement of the slidable member on said section of the pivotal lever parallel to the wedge of the wedge-shaped member when the lens is in the infinity position for adjusting the relative position of the slidable member without changing the angular position of the pivotal reflector.

MORRIS SCHWARTZ.
WILLIAM CASTEDELLO.